(12) United States Patent
Hertzog et al.

(10) Patent No.: US 7,930,752 B2
(45) Date of Patent: Apr. 19, 2011

(54) METHOD FOR THE DETECTION AND VISUALIZATION OF ANOMALOUS BEHAVIORS IN A COMPUTER NETWORK

(75) Inventors: Patrick Hertzog, Villars-sur-Glâne (CH); Pedro Bados Aguilar, Lausanne (CH)

(73) Assignee: Nexthink S.A., Lausanne (CH)

( * ) Notice: Subject to any disclaimer, the term of this patent is extended or adjusted under 35 U.S.C. 154(b) by 831 days.

(21) Appl. No.: 11/561,076

(22) Filed: Nov. 17, 2006

(65) Prior Publication Data

US 2007/0118909 A1 May 24, 2007

Related U.S. Application Data

(60) Provisional application No. 60/737,754, filed on Nov. 17, 2006.

(51) Int. Cl.
*G08B 23/00* (2006.01)
*G06F 15/173* (2006.01)

(52) U.S. Cl. ............................... 726/25; 726/23; 709/224

(58) Field of Classification Search .............. 726/11–15, 726/23, 25; 709/224
See application file for complete search history.

(56) References Cited

U.S. PATENT DOCUMENTS

| | | | |
|---|---|---|---|
| 6,088,804 A | 7/2000 | Hill et al. | |
| 6,240,450 B1* | 5/2001 | Sharples et al. | 709/224 |
| 6,584,501 B1* | 6/2003 | Cartsonis et al. | 709/224 |
| 6,839,852 B1* | 1/2005 | Pantuso et al. | 726/11 |
| 7,315,985 B1* | 1/2008 | Gauvin et al. | 715/734 |
| 2002/0082886 A1 | 6/2002 | Manganaris et al. | |
| 2004/0061701 A1* | 4/2004 | Arquie et al. | 345/440 |
| 2005/0044406 A1 | 2/2005 | Stute | |
| 2006/0173992 A1* | 8/2006 | Weber et al. | 709/224 |
| 2006/0182034 A1* | 8/2006 | Klinker et al. | 370/238 |
| 2006/0212569 A1* | 9/2006 | Ammerman et al. | 709/224 |

FOREIGN PATENT DOCUMENTS

EP 1 580 957 A2 9/2005
WO WO 2005/104482 A1 11/2005

* cited by examiner

*Primary Examiner* — Kambiz Zand
*Assistant Examiner* — Michael Guirguis
(74) *Attorney, Agent, or Firm* — Baker & Daniels LLP (57) ABSTRACT

A method for the detection of anomalous behaviors in a computer network, comprising the steps of:

collecting data relating to connections in a plurality of nodes in a network, sending the data from said nodes to an ADS platform, computing from said data at least one value representative of the anomaly level of the connections of each said node and/or of applications initiating said connections and/or of users, computing a multidimensional chart for visualizing the behavior of a plurality of nodes, applications and/or users in said network, wherein said value representative of the anomaly level is used as a dimension in said chart.

7 Claims, 7 Drawing Sheets

METHOD FOR THE DETECTION AND VISUALIZATION OF ANOMALOUS BEHAVIORS IN A COMPUTER NETWORK

This application claims the benefit of U.S. Provisional patent application Ser. No. 60/737,754 filed Nov. 18, 2005, the complete disclosure of which is hereby expressly incorporated by reference.

FIELD OF THE INVENTION

The present invention concerns a method for the detection of anomalous behaviors in a computer network. The present invention also relates to a management and monitoring platform for monitoring anomalous behaviors end events in a computer network.

DESCRIPTION OF RELATED ART

Intrusion Detection (ID) methods are known for detecting inappropriate, incorrect, or anomalous activity in a host, in a data flow or in a whole network. Although a distinction is sometimes made between misuse and intrusion detection, whereas the term intrusion is used to describe attacks from the outside and misuse is used to describe an attack that originates from the internal network, the present invention relates to both kinds of attacks, and to other anomalous behaviors that do not necessarily indicate an attack or any malicious activity.

The most common approaches to intrusion detection are statistical anomaly detection and knowledge-based intrusion detection. Knowledge-based intrusion detection systems are based on databases of known vulnerabilities, and usually use some kind of pattern-matching mechanism for detecting known malicious code in a network flow. When a known malicious pattern is found, an alarm is triggered.

The main advantage of knowledge-based intrusion detection systems is that they generate very low false alarm rates; even when an alarm is triggered, a lot of contextual help may be delivered to the administrator to assist him in deciding the most appropriate action.

However, knowledge-based intrusion detection systems are only able to detect known events. Any event that does not match an existing signature is considered acceptable. Therefore, the ability to detect intrusions depends on the regular update of knowledge about attacks. Maintenance of the knowledge base of the intrusion detection system is therefore a time-consuming task. Also, detection of abuses of privileges by insiders is difficult because no vulnerability is actually exploited by the intruder.

Behavior-based intrusion detection techniques are based on observation of deviations from normal or expected behavior of the computers, applications or users. The system learns a model of normal behavior by monitoring activity in the network, and later compares this model with the current activity. When a deviation is observed, an alarm is generated. Thus, any event that does not correspond to an assumed behavior generates an alarm. Examples of behavior-based intrusion detection systems are described in US2005/0044406, EP1580957 or US2002/0082886.

An advantage of behavior-based approaches is that they can detect new and unforeseen vulnerabilities, including 'abuses of privileges' that do not actually involve exploiting any security vulnerability. A drawback of is that they tend to generate a lot of false alarms. In many existing systems, alarms are simply registered in a log file which an administrator needs to consult. Security strongly depends on the ability of the administrator to recognize in this list behavior deviations that actually need some preventive or corrective action.

Furthermore, one sometimes distinguishes between network-based intrusion detection systems and host-based systems. Network-based intrusion detection systems only monitor the traffic in a branch or at an entry point of the network, for example in a firewall. Attacks that do not generate any suspicious event in this branch of the network remain undetected.

On the other hand, host-based intrusion detection involves loading a piece of software in the system to be monitored. U.S. Pat. No. 6,088,804 describes a solution in which a plurality of security agents are loaded in each monitored computer nodes in a network, and report detected attacks to a central monitoring platform. An example of host-based, behavior-based intrusion detection system is described in international application PCT/IB2005/001051. An advantage of host-based intrusion detection is that a lot of events in different nodes may be detected. The drawback, however, is that they tend to generate a lot of information, thus resulting in even more alarms and false alarms sent to the ADS platform and that need to be manually interpreted by the administrator.

A main drawback of existing intrusion detection systems, especially behavior-based and host-based solutions, is thus that they tend to produce an overflow of information, including many false alarms or alarms about minor events whose severity does not require immediate attention. A lot of knowledge and time resources are needed for manually interpreting those alarms and deciding on actions. In many cases, attacks are correctly detected by the intrusion detection systems, but still succeed because the administrator disregarded or overlooked the alarm.

It is therefore an aim of the present invention to provide an improved method for detecting anomalies in a network, for example an improved intrusion detection system.

Another aim of the present invention is to provide an improved behavior-based and host-based method for detecting anomalies in a network.

Another aim of the present invention is to makes it easier for administrators to interpret and exploit alarms triggered by the system, and to decide on an appropriate action.

BRIEF SUMMARY OF THE INVENTION

Objects of the invention have been achieved by a method for the detection of anomalous behaviors in a computer network, comprising the steps of:

collecting data relating to connections initiated by components in the network, said components selected from any one or more of a group including users, nodes and applications, sending said data to an anomaly detection system (ADS) platform, computing from said data an anomaly level of each component or of each of a group of said components, and computing a multidimensional chart for visualizing the behavior of said components or groups of components in said network in which said anomaly level of said components or groups of components is represented on a dimension in said chart.

Visualizing the behavior in a multidimensional chart has among others the advantage that a lot of information may be summarized and displayed on a single page. Using the anomaly level as a dimension in the chart allows for an immediate and intuitive visualization of the most anomalous nodes, applications or users in the network.

Using criticality as a dimension in the chart allows for an immediate and intuitive visualization of the most critical nodes, applications or users in the network.

The method of the invention further has the advantage that it may be used to monitor independently the behavior of nodes, users and/or applications. Thus, for example, anomalous behavior may be detected from observations of an application gathered in several nodes, or from the unusual roaming of one user through several nodes.

In a preferred embodiment, a system observes deviations in the behavior of nodes, applications and/or users from normal behaviors, whereas the definition of normal behavior may be different for each node, application and/or user.

In a preferred embodiment, the system is based, preferably exclusively, on monitoring connections in a plurality of nodes of the network.

Objects of the invention have also been achieved by a method for the detection of anomalous behaviors in a computer network, comprising the steps of:

collecting data relating to connections initiated by components in the network, said components selected from any one or more of a group including users, nodes and applications, said data including data identifying components, applications and destination ports, sending said data to an anomaly detection system (ADS) platform, computing from said data a multidimensional chart displaying said components, applications, and destination ports in the form of icons arranged along separate and essentially parallel axes, where the related components, applications and destination ports are interlinked between adjacent axes with lines to visualize the connections.

The visualization of the aforementioned connection parameters (data identifying components, applications, and destination ports) in a parallel coordinates graph provides a very useful, immediate and effective overview of network connections and activity by and between users, applications, nodes and destination ports. Components, applications, and destination ports may each be represented by icons that can be grouped with others of the same type on the same axis, respectively ungrouped.

The interlinking lines showing connections may advantageously be provided with thicknesses proportional to the number of connections following the same path.

Anomaly levels of connections may also be represented on the chart, for example by colors or hues of said icons and/or lines, dependant on the anomaly level.

BRIEF DESCRIPTION OF THE DRAWINGS

The invention will be better understood with the aid of the description of an embodiment given by way of example and illustrated by the figures, in which.

DETAILED DESCRIPTION OF THE EMBODIMENTS OF THE INVENTION

Figure 1:
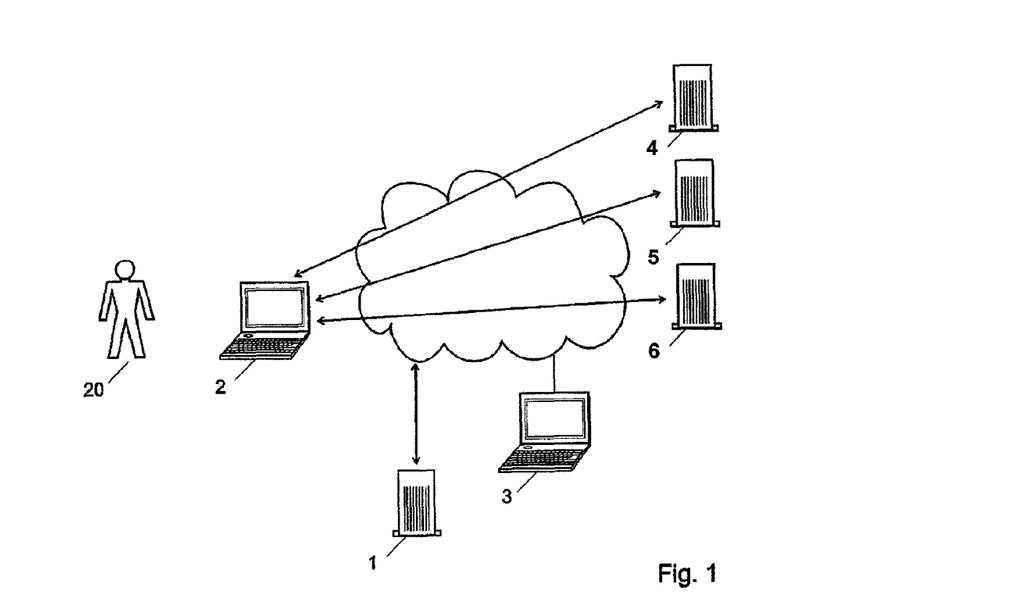
FIG. 1 is a diagram of a computer network comprising a plurality of nodes having drivers for intercepting and reporting connections, an anomaly detection system (ADS) platform for computing the anomaly level of each connection, and a visualization platform for the visualization of the behavior of the nodes, applications and/or users.

FIG. 1 illustrates an example of a network in which the anomaly detection system of the invention is used. The network may be for example a local network within a company, or any kind of protected, internal network. It comprises a plurality of nodes 2, such as computer nodes, including servers and appliances, interconnected over any suitable network protocol, such as for example an Ethernet network or any other preferably packet-based data communication network. For the sake of simplicity, a single node 2 is illustrated on FIG. 1; in a real environment, the protected network may comprise any number from 1 to several thousands of nodes.

Each node may be operated by one or several users 20, including physical and virtual users, and may run one or several applications. Furthermore, at least the monitored nodes 2 run a driver for collecting information on each connection involving or initiated by the node, and for sending this information to an ADS platform 1 in the internal network. In a preferred embodiment, the drivers in the nodes are purely passive, i.e. their role is limited to sending data relating to each connection to an ADS platform; they do not however try to block connections or to take any other preventive or corrective measures. This makes deployment of the drivers easier, as only small pieces of software need to be installed in each node, and as those drivers do not need any privilege or special authorizations to operate.

The ADS platform 1 collects security-relevant information gathered by the drivers at a plurality of monitored nodes in the network, and detects unusual or anomalous events in this information flow. The ADS platform 1 may be for example a dedicated appliance, or a standard Windows (trademark of Microsoft) or UNIX server running a dedicated application for collecting data relating to connections from the nodes and for computing parameters derived from those data, including anomaly level.

Furthermore, a visualization platform 3 in the network is used for displaying, on a monitor, information derived at least in part from the ADS platform 1, as will be seen later. This information is displayed at least partly in graphical form. The visualization platform may be any of the nodes 2 running a special visualization application. In another embodiment, the visualization platform 3 and the ADS platform 1 are combined into one device. It is also possible to display the charts derived from information processed by the ADS platform as web pages that can be seen from any node in the network.

The network of FIG. 1 further comprises a plurality of nodes, such as a web server 4, a mail server 5 and/or a SAP server 6 with which each computer node 2 may establish connections over various ports. Nodes 4, 5 and 6 may be internal, for example within the company network, or external, for example on the WAN side of a firewall.

Each connection may be described with an n-tuple whose elements include start time, end time of the connection and/or duration of the connection, user, source node, application, port, destination host. The passive drivers on the monitored nodes 2 gather those five items of data for each connection involving the node, and send the corresponding n-tuple, called connection footprint, to the ADS platform 1.

The ADS platform 1 analyzes each connection, individually or related to other ones, to determine its level of abnormality. If the connection is considered as abnormal, an alarm may be triggered. The alarm may include information such as the severity level, the confidence level and the connections that led to that alarm. Moreover, the ADS platform 1 is able to compute several metrics about the different components interacting within the network, including for example the anomaly level, the criticality level, and the activity level of the monitored node, application or user.

An important objective of the connection analysis is the computation of one or more values of anomaly level associated to the users, applications or nodes in the network.

The main goal of this anomaly level computation is a first qualitative estimation of the potential deviation from the normal behavior for each one of said components. Therefore, this value will permit the administrator to categorize, filter and visualize the components by level of anomaly level, focusing on the most anomalous events in the network.

Figure 2:
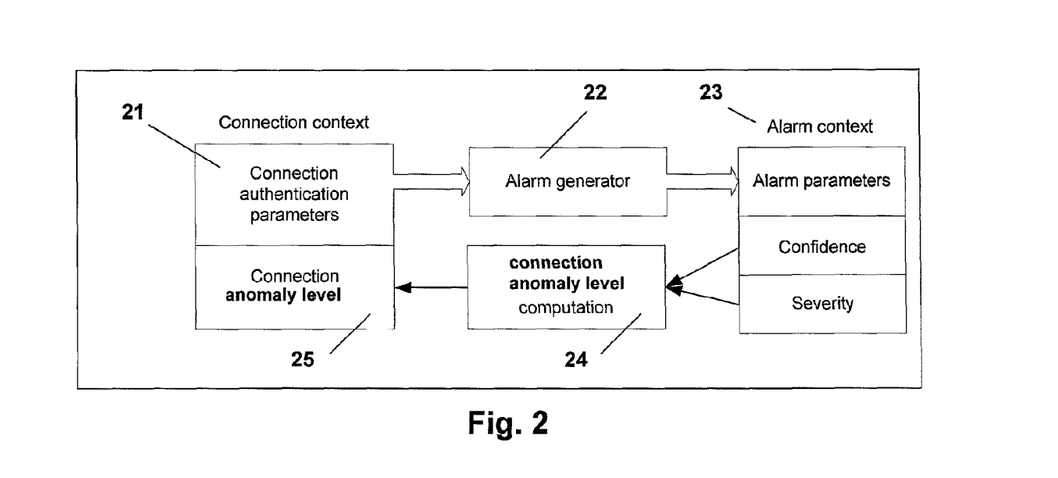
FIG. 2 is a diagram illustrating the computation of the anomaly level.

A basic diagram for the computation of the anomaly level is displayed in FIG. 2. The different values of anomaly level are obtained and updated based on the anomaly level of each new connection. At this point, we will describe a way of computing the anomaly level of a particular connection, and later we will extend this computation to other components, such as nodes, users and applications.

Block 21 represents a set of parameters associated with a certain connection such as, but not limited to, the ones received from each node in the connection footprint: source IP, destination IP, destination port, user ID and application details. Block 22 represents a detection engine which generates different alarms based on those parameters. These alarms indicate, among others, two values: severity level and confidence level, as indicated in block 23.

Severity level is a number within a specific range, for instance between 0 and 1, and depends on the type of alarm detected. The severity level may also depend for example on the importance of nodes, users and/or applications affected by the alarms. The importance can be defined by the administrator or extracted from known security practices.

The confidence level is an estimation of the alarm generator about the certainty of the alarm. It will have a maximal value for alarms generated when the footprint or set of footprints matches a predefined rule. The confidence level will be between 0 and a maximum for a behavior-based event such as abnormal activity for a specific application. Different methods of detection (Bayesian Networks, HMM or pattern matching) will provide different ways of computing the confidence level in the generated alarm. For instance, in a HMM modeling, the confidence level indicates the a priori probability of having a certain sequence of connections.

When the severity level and confidence level are obtained for the alarm, the anomaly level of the connection 25 which generated such an alarm can be computed in the block 24 as a linear combination of both:

$$((alpha \times severity\ level) + (beta \times confidence\ level)) = anomaly\ level\ where\ (alpha + beta) = 1$$

In the case of alarms composed by different connections, the anomaly level will be associated at least with the last connection added.

In the case of one connection generating several alarms, the anomaly level for the connection will be the maximum of all the computed values.

In the case where no alarm is generated for a connection, the anomaly level will be 0.

Therefore, the analysis engine will receive a sequence of connections along with a value of anomaly level for each of them according to the possible alarms generated. We will now describe in FIGS. 3 and 4 how to obtain the different values of anomaly level for each component, i.e. user, application or (source) node.

Figure 3:
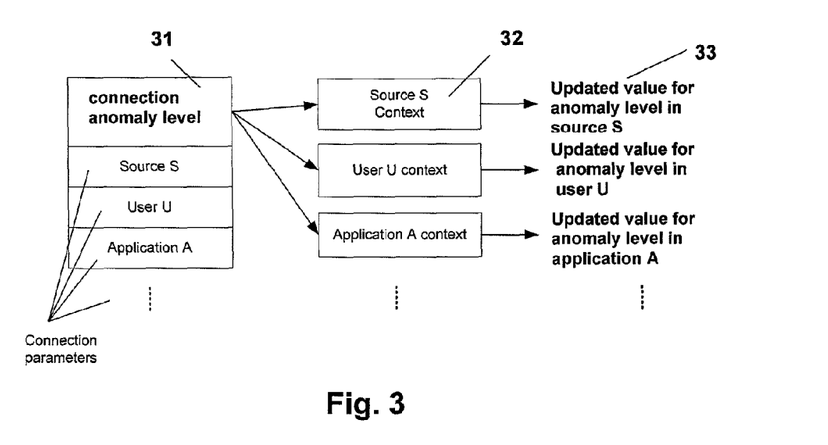
FIG. 3 is a diagram illustrating how the anomaly level of a connection is sent to different contexts.

In FIG. 3, we see how the connection anomaly level 31 is sent to the different contexts 32 for each parameter (source node, user and application) where a new per-component anomaly level value will be computed 33. The context of a component will save the previous anomaly level (e.g. for user U, the context U will contain the current anomaly level for this user) and it will update it according to the anomaly level of the new connection.

Figure 4:
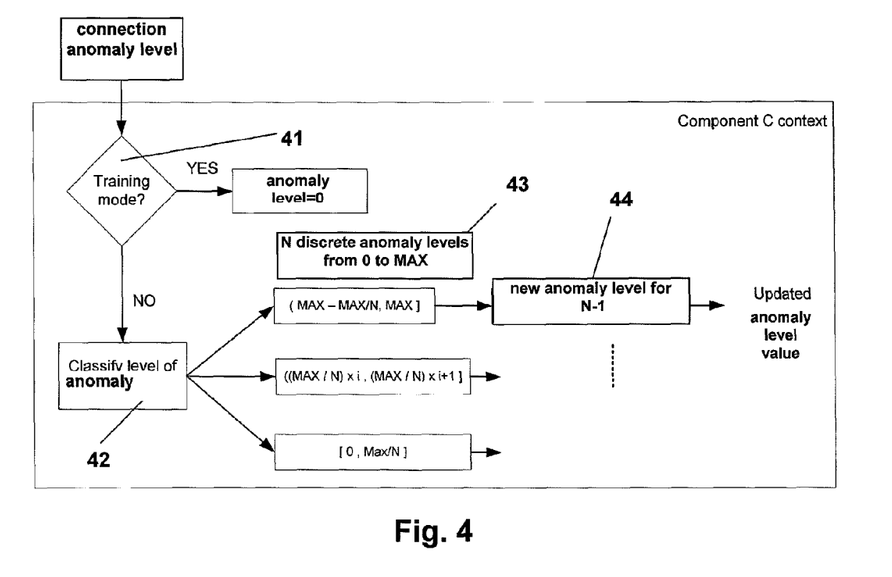
FIG. 4 is a diagram illustrating the update of anomaly level of a component according to a new connection.

This procedure to obtain the new update of anomaly level in the context of one component C is illustrated in FIG. 4. Firstly, the system checks that said component is not in training mode (block 41), otherwise the new anomaly level is set to 0. Training mode will be an initial status of any new component C which is quitted only after a certain set of minimal conditions for such component is fulfilled. One important goal of the training is to avoid the initial unstable and chaotic stage which might lead to inaccurate values.

For instance, a good set of training conditions for a component user is a minimum number of connections plus a minimal period of time. Therefore, if one of both conditions is false, the anomaly level will be 0 and the users will stay in training mode. Similar conditions using other parameters can be defined for any component.

If the component is not in training mode, a classification of the anomaly level associated to the connection is performed (block 42). The system will assign the connection to a certain slot from N possible discrete ranges of anomaly level (block 43). Each one of these intervals will have different values of alpha and beta to compute the new updated value according to the following expression:

$$New\ anomaly\ level = alpha \times current\ anomaly\ level + beta \times conn\_anomaly\ level/(alpha + beta)$$

This expression is embedded in block 44 to provide the new anomaly level of each component C.

The values of alpha and beta can be chosen in a way where beta>=alpha following the rules: beta≈alpha for anomaly level levels close to 0 and beta>> alpha for intervals close to the maximum. The goal of such a strategy is to accelerate the incrementation of the new anomaly level at high levels of conn_anomaly level while decreasing it slowly when levels are close to 0.

Preferably, the confidence level, the severity level and therefore the anomaly level are all computed in real time.

It may be noted that the alfa and beta values to associate weight to the importance of the severity level and the confidence level may be adjusted by the administrator empirically to reduce the anomaly levels without removing the alarms. Initial values may be set as 1.

In the case of alarms generated by rule based anomaly detection, for instance the rule <<detect if this application is active on the network>>, the confidence level may be set at the value 1, and the severity level may be set by the administrator or by a default value depending on the type of application, stored in the ADS. If alfa and beta are 1, the severity level will correspond to the anomaly level of the connection.

In the case of alarms generated by behavior based anomaly detection, for example as described in WO 2005/104482, which computes the probability of the abnormal behavior of a certain user, the probability may be used as the confidence level, while the severity level may be set by the administrator or by a default value depending on the type of user, stored in the ADS.

In the case of alarms generated by pattern matching anomaly detection, for example <<port scanner detection>>, the severity level may be set by the administrator while the confidence level can be associated to the number of ports (since if we have more ports we have more certainty about the detection of an anomaly).

In general therefore, the severity level is usually set by the administrator, while the confidence level is given by the nature of the anomaly detection system, possibly with a certain heuristic to estimate the degree of certainty in the detection.

Another important feature of the system is the computation of a value denoted as criticality level for each component of a connection. In the following paragraphs, we will introduce some examples of these components as well as the way of computing this value.

The main objective of criticality level is the proper estimation of a potential repercussion or influence of a security threat concerning a certain network component. Such a component can be a user, an application or a node. However, a similar value of criticality level might be computed by similar procedures for any other entity such as port, protocol, network or service.

One important advantage of this criticality level value is that it can speed up the administrator decision-making regarding the policy and efforts to be applied. For instance, a user with a high criticality level can quickly lead to certain decisions to better protect his identity (e.g. changing password every week) while for low criticality level users a more flexible and tolerant measure could be accepted.

The way of computing the criticality level is associated with the number of parameters for each connection and certain specific weights associated for each one of such parameters. One important goal is to compute this value based on the complexity in the behavior plus on the values given by the administrator according to the importance or dangerousness of each resource. For instance, sources with many different connections will necessarily involve a more complex behavior resulting in higher criticality levels. At the same time, the vulnerability or dangerousness of the source from the security point of view must be taken into account to reinforce the criticality level estimation.

We will now describe one possible method for computing the criticality level for a component C.

1. For each class of component (e.g. class user, class node, etc.) we have a global counter of the number of different types of connections so we can compute the mean M corresponding to such class. For instance, if C is a user, we will compute the mean of the number of different types of connections for any component user in the network.
2. We make a list of all types of connections which contains the component C. For each one, we compute a number N according to the weights associated to the parameters as follows:

$$N = W_{label\ parameter\ 1} \times W_{label\ parameter\ 2} \times W_{label\ parameter\ 3} \times \ldots$$

For instance, let's assume that a connection is composed of three parameters: node source, user and application. For each one, we choose among three possible labels: critical, normal or irrelevant. Each one of these labels is associated to a weight W. Let the weights be 5, 1 and 0.2 respectively. In a connection with normal source and normal user but critical application, N will become:

$$N = W_{normal} \times W_{normal} \times W_{label\ critical} = 1 \times 1 \times 5 = 5$$

A similar procedure will be applied independently of the number of labels and parameters.
3. We add every N from all the types of connections associated to the component and we denote this final number as S.

It is trivial to observe that in the case of a connection containing just normal components, N becomes 1. Moreover, if N is 1 for every case, the value of S will be the number of different types of connections. This is an important advantage of the system since the administrator is not forced to assign labels to the different resources. The system will ignore this information and it will just work with the complexity to compute the criticality level.
4. The last point is to scale the value of S. To do so, one procedure might be using M for this class in the following way:

$$\text{Criticality level} = 1 - \exp(-S/M)$$

A further important feature of the invention is the ability to compute <<risk>> in a meaningful way, and that can be easily represented or visualised as a function of the component (application/user/node . . . ) observed. The level of risk may be computed as follows:

Risk for an component=anomaly level of the component×criticality level of the component As described above, a lot of information is collected about the network, its components and the occurring events and that information is tightly interrelated. Such an amount of information can quickly become overwhelming for a person (the network administrator) willing to take advantage of it. To ease that process, the idea is to provide the administrator with a set of multidimensional charts visualizing the information from different perspectives.

The first perspective is to focus on network components which include users, applications, and nodes. In that visualization, network components (or clusters of network components) are displayed on a plot, each axis representing a numerical attribute of the network component. The scale of each axis may follow any arithmetical function, the simplest one being a linear function. On the plot, the network component may be represented by either a specific icon or a geometrical shape and its size and color may represent other attributes of the network component.

Figure 5:
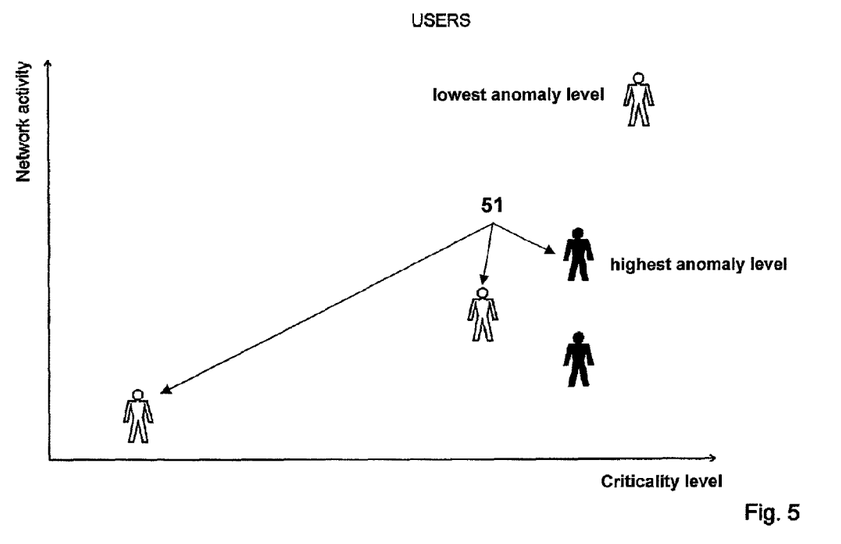
FIG. 5 is a scatterplot chart showing the criticality level, the current network activity and the anomaly level of different users.

Example: in FIG. 5, the criticality level and activity of several users in a network are displayed as icons 51 on a scatterplot. The position of each user on the chart depends on their criticality level (on the horizontal axis)

and on their current network activity level (on the vertical axis). The color of the icons reflects the current or cumulated anomaly level of behavior of each user. In this example, the darkest icons mark the users with the highest anomaly levels.

Figure 6:
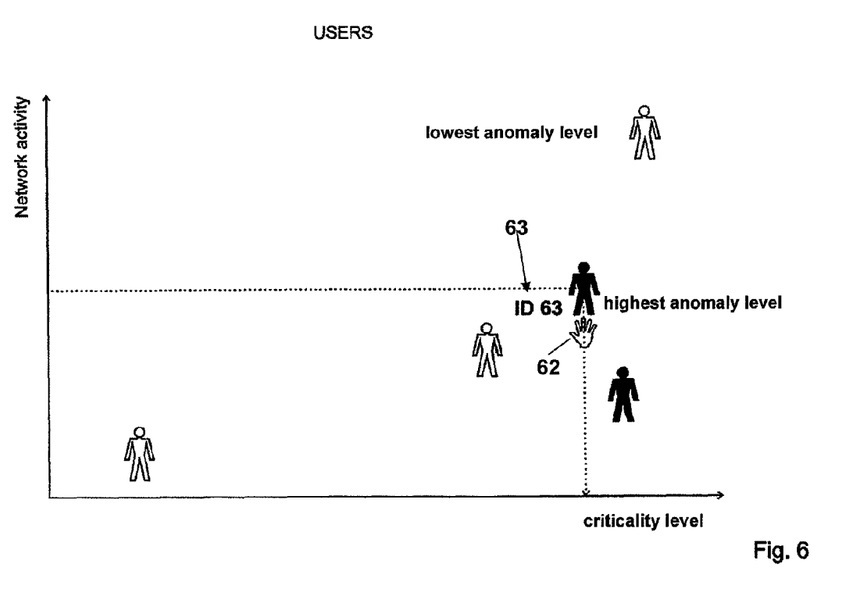
FIG. 6 illustrates how additional information about a specific user may be displayed by pointing the mouse cursor on the user.

Additional information may be displayed by pointing the mouse cursor 62 on the different users in the chart, as shown on FIG. 6. In this example, the identification 63 of the user will be displayed.

A second chart focuses on the activity of network components over a certain period of time. In that visualization, time is one axis of the chart, the other being the network components (or clusters of network components). The time axis is sampled with a certain granularity: if T is the time period represented on the axis and n the number of samples over that period, it means that the axis is divided in n portions, each one representing a duration of T/n (it is a case of linear granularity but other kinds of granularity may be defined). Therefore, for each network component (or cluster of network components), a set of n rectangles is defined, each rectangle representing the activity level of the corresponding network component (or cluster of network components) during the related time sample by the mean of a color gradient. If some abnormal activity occurred during that time sample, the corresponding rectangle reflects it, e.g., by changing its color to a color corresponding to the anomaly level of the triggered alarm. Moreover, the chart may be enhanced with additional graphs summarizing the activity either by network component (or cluster of network components) or by time sample.

Figure 7:
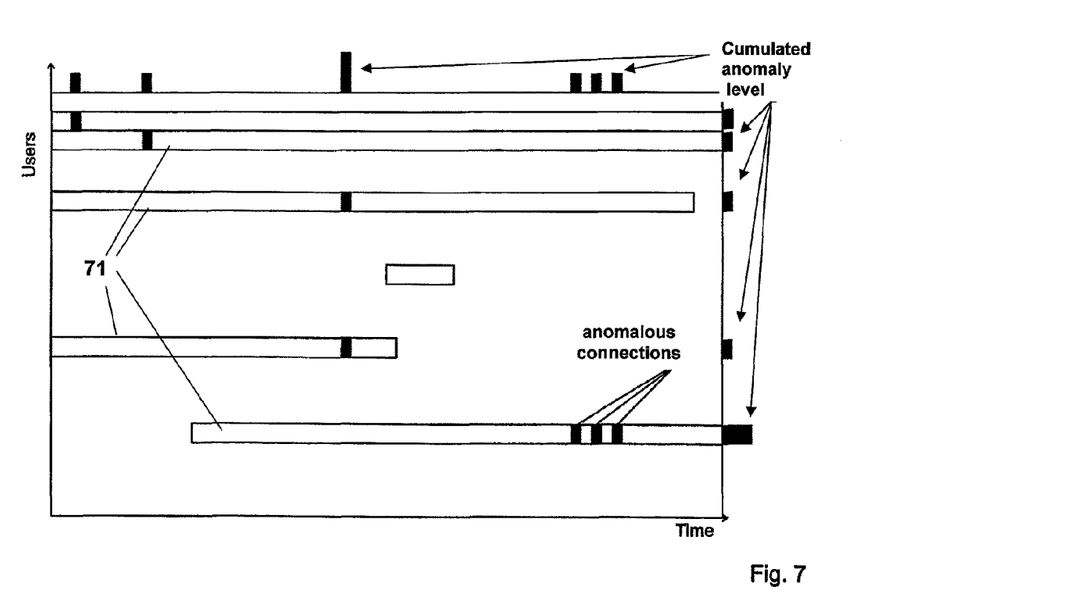
FIG. 7 illustrates a chart for visualizing the activity of several users as a function of time, whereas the anomaly level of each connection is displayed with colors or hues.
Figure 8:
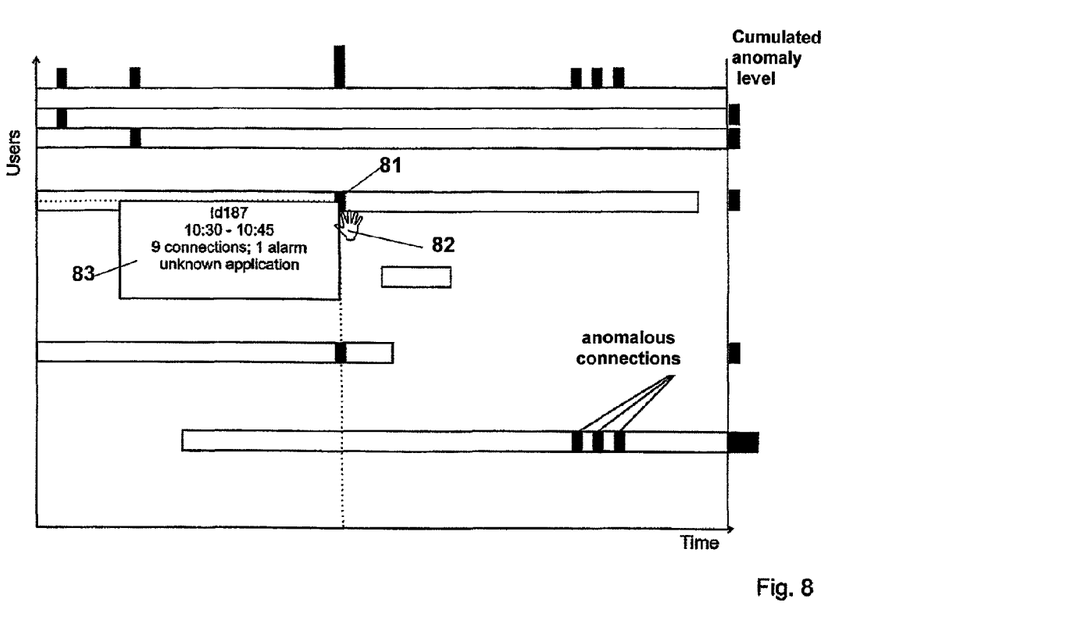
FIG. 8 illustrates how additional information about a specific connection, or about a specific group of connections, may be displayed by pointing the mouse cursor on the connection, or group of connections.

Example: in FIGS. 7 and 8, the network components represented on the chart are the different users 71, (or clusters of users) on the vertical axis and time is represented on the horizontal axis. The upper line indicates the cumulative anomaly level of all users at any particular moment of time.

In this particular example, the time axis corresponds to a period of one day divided in samples of 15 minutes. If a rectangle is empty (i.e., background color), it indicates that there is no activity (no connections) from the corresponding user during the corresponding 15 minutes time sample. The brighter the rectangle is, the higher the activity level (not shown). Colored rectangles (not shown; for example yellow—orange—red) represent alarms; the color or the intensity depends on their anomaly level. If several alarms are to be represented in one single rectangle, its color is determined by the alarm with the highest anomaly level, or by adding the anomaly levels of the several alarms within the time period. On top of the chart, a graph summarizes the alarms by time sample and, on the right-hand side, another graph summarizes them by user.

Again, pointing the cursor 82 on a particular connection 81 displays additional information 83 about this connection, as shown in FIG. 8.

Similar graphs may be displayed in which other network components, for example applications, groups of applications, nodes or groups of nodes, are used instead of the user on the vertical axis.

A third chart is focused on a set of connections that occurred on the network over a defined period of time that may be chosen by the administrator, for example over the past 2 days, week or between two chosen dates, or over a default period set by the ADS. The graphical representation used to display a set of connections is in the form of a parallel-coordinates graph. It comprises a set of parallel axes, each one representing one component of the connection. All components or a subset of them can be used as axes and their order can be chosen according to the situation. On each axis, the possible values of the corresponding component are displayed. Each connection is represented by a polygonal line linking the values (or meta-values) on the different axes. The thickness of the line is proportional to the number of connections and its color may represent the anomaly level of its corresponding connections.

Figure 9:
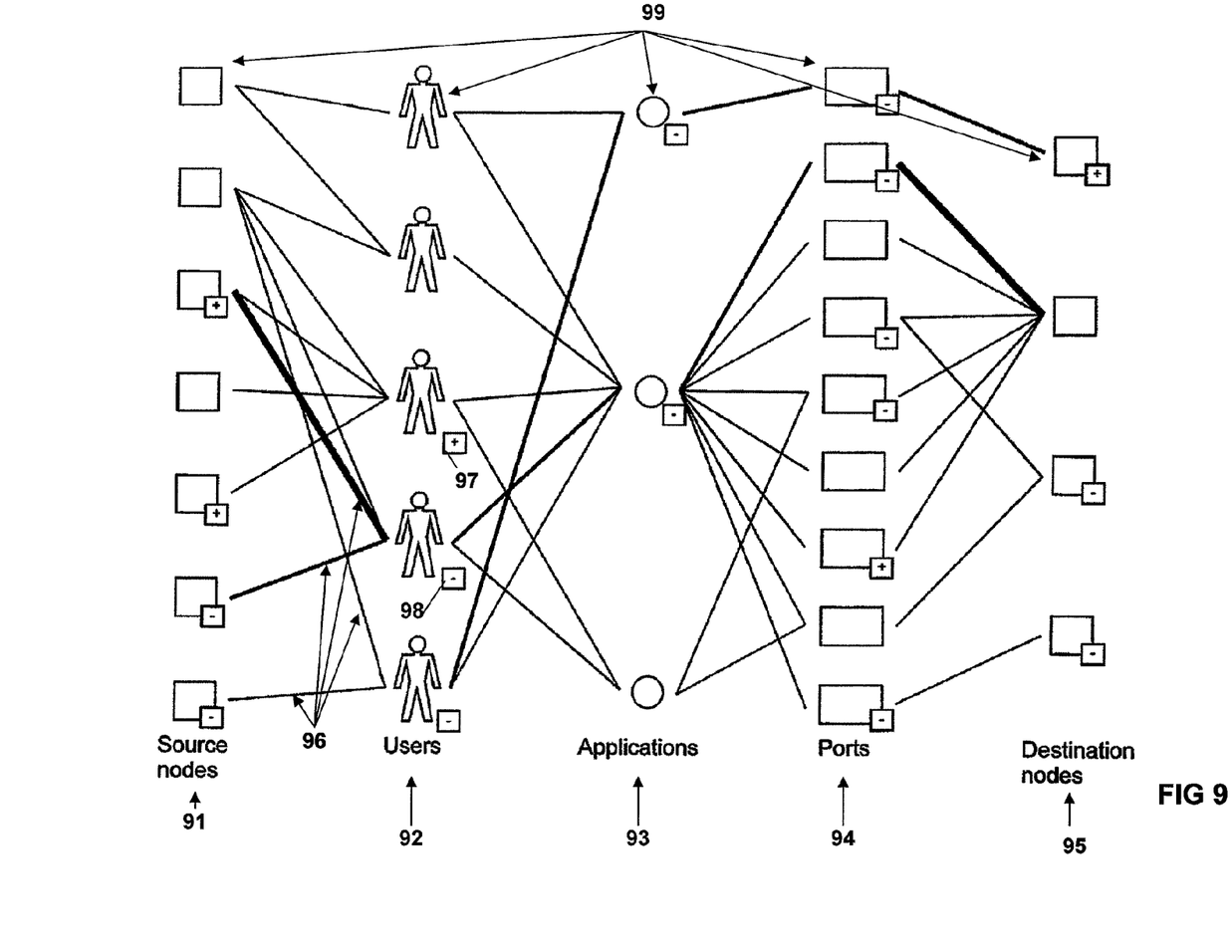
FIG. 9 is a chart illustrating connections between source nodes, users, applications, ports and destination nodes.
Figure 10:
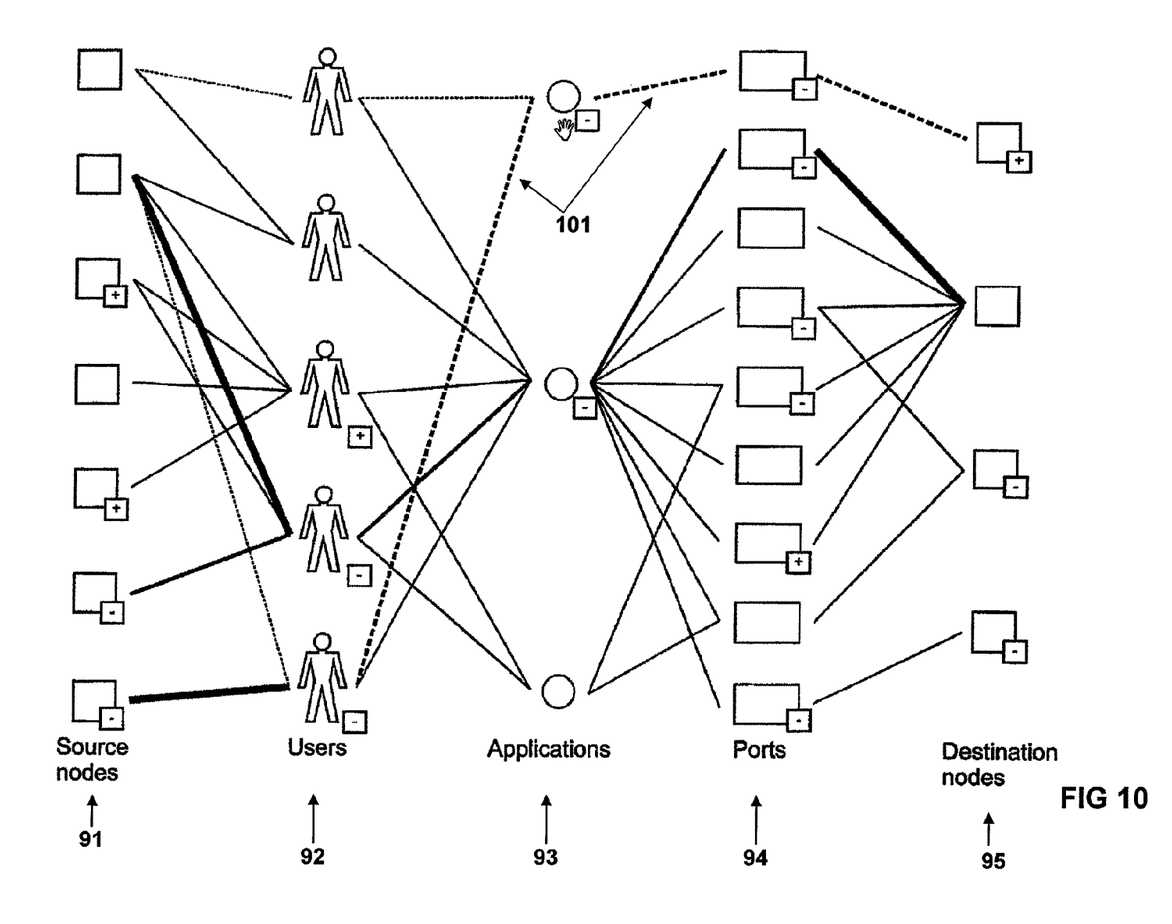
FIG. 10 illustrates how connections may be highlighted by pointing the cursor on a specific element of the chart of FIG. 9.

Example: in FIGS. 9 and 10, a set of connections is displayed according to five axes along which components and other connection footprint parameters are arranged: source 91, user 92, application 93, port 94 and destination 95. Each axis parameter (or group of parameters) is represented by an icon 99; the [+] overlay 97 shows values that can be ungrouped and the [−] overlay 98 shows parameters that can be grouped. Parameters that belong to the same group are linked with a dotted line 101. The thickness of the lines 96 interlinking connection parameters between adjacent axes is proportional to the number of connections following the same path and the color (not shown) of the lines and/or the icons may be dependent on the anomaly level of the connection.

In the visualizations presented above, one can always display individual network components or clusters of network components. Network components can be interactively grouped (and inversely) according to similar characteristics. For instance, all applications of the same category (e.g., browsers) can be grouped to form a meta-application (e.g., representing all browsers). Meta-applications can be grouped together to form a higher order group (e.g. browsers and e-mail clients grouped into internet applications) and so on. Formally, it follows the process described in FIG. 11.

Figure 11:
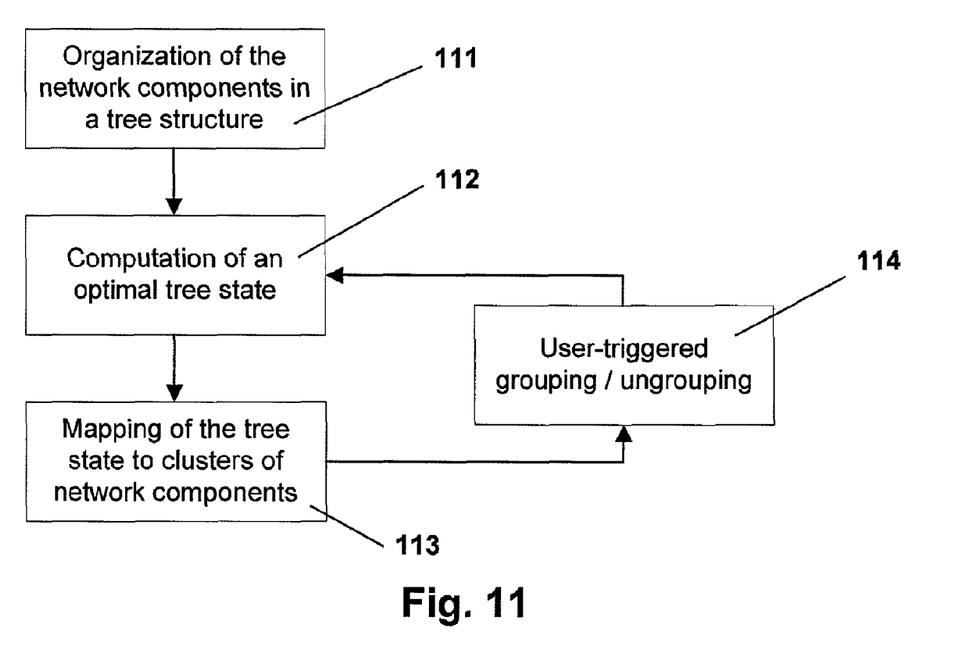
FIG. 11 is a diagram showing the grouping/ungrouping of network components.

First, in 111, the different network components have to be organized in a tree structure. Each node of the tree corresponds to a similar characteristic of its children components and the leaves contain the actual network components. Each node also has an attribute state indicating if it is collapsed (i.e. its children will be displayed as a cluster) or expanded (i.e. its children will be displayed individually). One can choose any characteristics for the nodes as long as one network component is only represented by one leaf of the tree. However, the more balanced the tree is, the better the result will be. In 112, an optimal tree state is computed. Computing a tree state means setting the state attribute of each node in order to respect some constraints:

the screen real estate is limited and each displayed network component (or cluster of network components) needs a minimal amount of space;

the maximum number of network components (or clusters of network components) should be displayed;

the actions taken by the user in 114 have to be respected.

Once an optimal tree state has been computed, it can be mapped to the actual graphical representation (113). It means that each leaf whose state of its parent node is expanded will be displayed as an individual network component. On the other hand, each collapsed node whose state of its parent node is expanded will be displayed as a cluster of network components.

The visualizations are also fully interactive in order to provide an intuitive way of navigating through the data, drilling down and switching between the different perspectives described above. For instance, in the visualizations given in the example above, additional information is displayed when the mouse cursor is pointed on the different graphical components (see FIG. 6, 8 and 10). By clicking on the visually represented network components, they can be easily grouped and ungrouped as described in the paragraph above to give the possibility of semantically zooming in/out (in opposition to a pure visual zoom) as illustrated in FIG. 10. By clicking on a network component in the visualization shown in FIG. 5 or on a particular rectangle in the chart shown in FIG. 7, the associated connections can be displayed in a visualization as shown in FIG. 9.

Moreover, it is possible to provide investigation tools, allowing the administrator to define conditions for connections, alarms and/or network components he wants to be displayed. An adapted chart will then be displayed showing only the connections, alarms and/or network components that fulfill those conditions. For example, an administrator may want to focus on the most anomalous events affecting users with the highest criticality level during the last 24 hours, and to display charts showing only those conditions. Various sets of conditions may furthermore be stored for further retrieval.

Investigation tools allow the administrator to find information fulfilling conditions related to the past. Following the same principles, it may be possible to provide surveillance tools allowing the administrator to be alerted when connections, alarms and/or network components will respect some conditions in the future and to display those connections, alarms and/or network components in an adapted chart. For example, an administrator may want to be alerted when users are connecting to a certain server and display the incriminated connections. Various sets of conditions may furthermore be stored to define several surveillances executed in parallel.

The invention claimed is:

1. A method for the detection of anomalous behaviors in a computer network, comprising the steps of:
    collecting data over a defined period of time relating to a set of connections comprising a plurality of connections initiated by components in the network including connections that occurred over said defined period of time, said components selected from any one or more of a group including users, nodes and applications, said data including data identifying components, applications and destination ports,
    sending said data to an anomaly detection system (ADS) platform,
    computing from said data a multidimensional chart displaying said components, applications, and destination ports in the form of icons along separate and essentially parallel axes, where the related components, applications and destination ports are interlinked between adjacent axes with lines to visualize the set of connections.

2. The method of claim 1, wherein the numbers of connections initiated by each component or group of components over time are computed and represented on said chart.

3. The method of claim 2 wherein the lines have thicknesses proportional to the number of connections following the same path.

4. The method of claim 1 wherein said components, applications, and destination ports are each represented by icons that can be grouped with others of the same type on the same axis, respectively ungrouped.

5. The method of claim 1 wherein anomaly levels of connections are computed and represented on the chart.

6. The method of claim 5 wherein said anomaly levels of the connections are represented by colors or hues of said icons and/or lines, dependent on the anomaly.

7. The method of claim 1 wherein the chart further includes destination nodes in the form of icons along a further separate and essentially parallel axis interlinked with lines to destination ports to visualize the connections.

* * * * *